United States Patent [19]
Merz et al.

[11] Patent Number: 6,099,173
[45] Date of Patent: Aug. 8, 2000

[54] CONICAL CENTERING PROCESS AND DEVICE

[75] Inventors: Gary E. Merz; Edward B. Richter; Steven P. Vogel, all of Rochester, N.Y.

[73] Assignee: Eastman Kodak Company, Rochester, N.Y.

[21] Appl. No.: 09/212,460

[22] Filed: Dec. 16, 1998

[51] Int. Cl.[7] .............................. B03B 17/24; B21D 39/03
[52] U.S. Cl. ............................. 396/515; 29/428; 29/464; 206/578; 242/348.4
[58] Field of Search ...................................... 396/515, 388, 396/429, 511, 512; 242/348.4, 338.1, 338.2, 348, 588.5, 588.6; 206/397, 389, 407, 408, 578; 29/428, 464

[56] References Cited

U.S. PATENT DOCUMENTS

| | | | |
|---|---|---|---|
| 5,708,879 | 1/1998 | Manico et al. | 396/207 |
| 5,709,022 | 1/1998 | Shimizu et al. | 29/434 |
| 5,715,494 | 2/1998 | Harris et al. | 396/515 |
| 5,743,482 | 4/1998 | Suzuki et al. | 242/533.4 |
| 5,953,806 | 9/1999 | Suzuki et al. | 29/430 |
| 5,971,312 | 10/1999 | Takatori et al. | 242/348.4 |

*Primary Examiner*—David M. Gray
*Attorney, Agent, or Firm*—Mark G. Bocchetti; Arthur H. Rosenstein

[57] ABSTRACT

A visual exposed film indication feature has been developed for assembly of additional features to film cartridges which minimize the impact on the existing manufacturing process. This process which uses a spring loaded conical centering device locates the center of the film spool after the assembled cartridge has been inserted into the packaging canister, without having to first rotationally orient the assembled film cartridge. It allows the exposed film feature to be added to the cartridge as a final step in the manufacturing sequence.

9 Claims, 8 Drawing Sheets

CONICAL CENTERING PROCESS AND DEVICE

FIELD OF THE INVENTION

The invention relates generally to the field of manufacturing, and in particular to parts manufacturing and assembly.

BACKGROUND OF THE INVENTION

What is needed in the photographic art is a film cartridge such as a 135 film cartridge, which will indicate whether the film cartridge has been exposed.

Recently, there has been a desire by snap-shooters, photo-enthusiasts and professionals to be able to determine if a roll of film has been advanced through a camera or has never been used. This can be accomplished by attaching an exposed film indicator to the long end of the spool on a 35 mm cartridge. This is primarily needed when shooting multiple rolls of film, or, for the purposes of some consumer and professional cameras, when a roll is only partially exposed to be used again later.

One problem involving assembling the exposed film indicator to the cartridge, is developing a method to reliably attach two thin disks to the long hub end of the spool. The inner (or exposed) disk is attached to the spool hub by three barbs and therefore rotates with the spool. The word EXPOSED may be printed on it, or to differentiate from the outer disk, it may be a different color. The outer (or unexposed) disk is attached to the crimp diameter of the end cap. It remains stationary relative to the cartridge. The word UNEXPOSED may be printed on it, or, again to differentiate from the inner disk, it may be a different color. When a customer purchases a fresh roll of film, the outer disk will be visible. As film is wound back into the cartridge after the pictures are taken, a tab that sticks up on the inner disk engages a tab that sticks down on the outer disk. The inner disk then exits through a slot in the outer disk and is visible to the customer.

U.S. Pat. No. 5,708,879 shows a film cartridge with a visual exposure status indicator.

U.S. Pat. No. 5,715,494 is another example of a film cartridge with a visual exposure status indicator.

To implement adding exposure indication to a 35 mm film cartridge in a timely and cost effective manner, it is necessary to minimize the impact on the existing manufacturing infrastructure. Given the complexity of this infrastructure and the space constraints around the equipment, it is highly desirable to add the feature after the film cartridge is completely assembled. Since the completed film cartridge is loaded into the canister at the end of the film winding operation, the feature must be assembled to the cartridge either by removing the cartridge from the canister or while the cartridge is in the canister. It is advantageous to assemble the feature to the film cartridge while it is in the canister since:

1) The canister provides a convenient method of conveying and singulating the film cartridges for the assembly operations.
2) It is difficult to reinsert the film cartridge back into the canister without using a special motion to wrap the film leader around the cartridge.
3) Reduced handling of the cartridges and thus the potential for cosmetic damage to either the cartridge or the film leader is reduced.
4) Equipment space limitations does not permit cartridge removal.

SUMMARY OF THE INVENTION

The above problem of applying an exposed film indicator to the cartridge after assembly of the cartridge is solved by the conical centering process described herein.

The assembly process will accept the canned cartridges opened end up, either from a tray unloader or from a centrifugal feeder. Individual canisters will be singulated on the infeed conveyor, using a separator screw. They will then be loaded onto either a continuous motion rotary assembly turret, a dial indexer or some type of assembly chassis. Using this motion generated by the chassis and the tooling, this process can be used to find the center of the spool so that the exposed film indicator can be applied.

The assembly device will contain a spring loaded conical center. This conical center will be located such that in any orientation of the magazine within the canister, the conical point will be within the inside diameter of the spool. To help center the product, an optional spring loaded member such as a roller may be added to push against the side of the canister to help nudge it towards center. If the product assembly is oriented the opposite way, and does not need to be nudged in that direction, the spring will compress, thus allowing the conical center to center the product as it was intended to. The conical center will slowly be lowered such that the conical center will enter the spool inside diameter. As it continues lower, the spool and thus the cartridge, will move to match the conical center of the assembly device or tooling head.

Once the center of the spool has been found, the inner exposed film indicator disk will be applied with a straight vertical motion. The device will continue down until it bottoms out on the end cap, thus guaranteeing that the exposed film indicator disk will be applied to a fixed location, always the same, relative to the end cap. By applying the exposed film indicator to a fixed location, the spool can not be forced against the magazine end cap, which could cause binding, and excessive torque requirements to turn the spool. Applying the exposed film indicator disk in this manner will deform the tabs that attach it to the spool, so it cannot spin on the spool or be removed easily.

It is noted that if desired, the functionality of the exposed film indicator can be reversed by having the inner disk designated as unexposed and the outer disk designated as exposed and assembled to the cartridge in reverse order.

BRIEF DESCRIPTION OF THE DRAWINGS

The foregoing and other objectives, features, and advantages of the invention will be apparent from the following more particular description, including the presently preferred embodiments of the invention, as illustrated in the accompanying drawings in which.

DETAILED DESCRIPTION OF THE INVENTION

Figure 1:
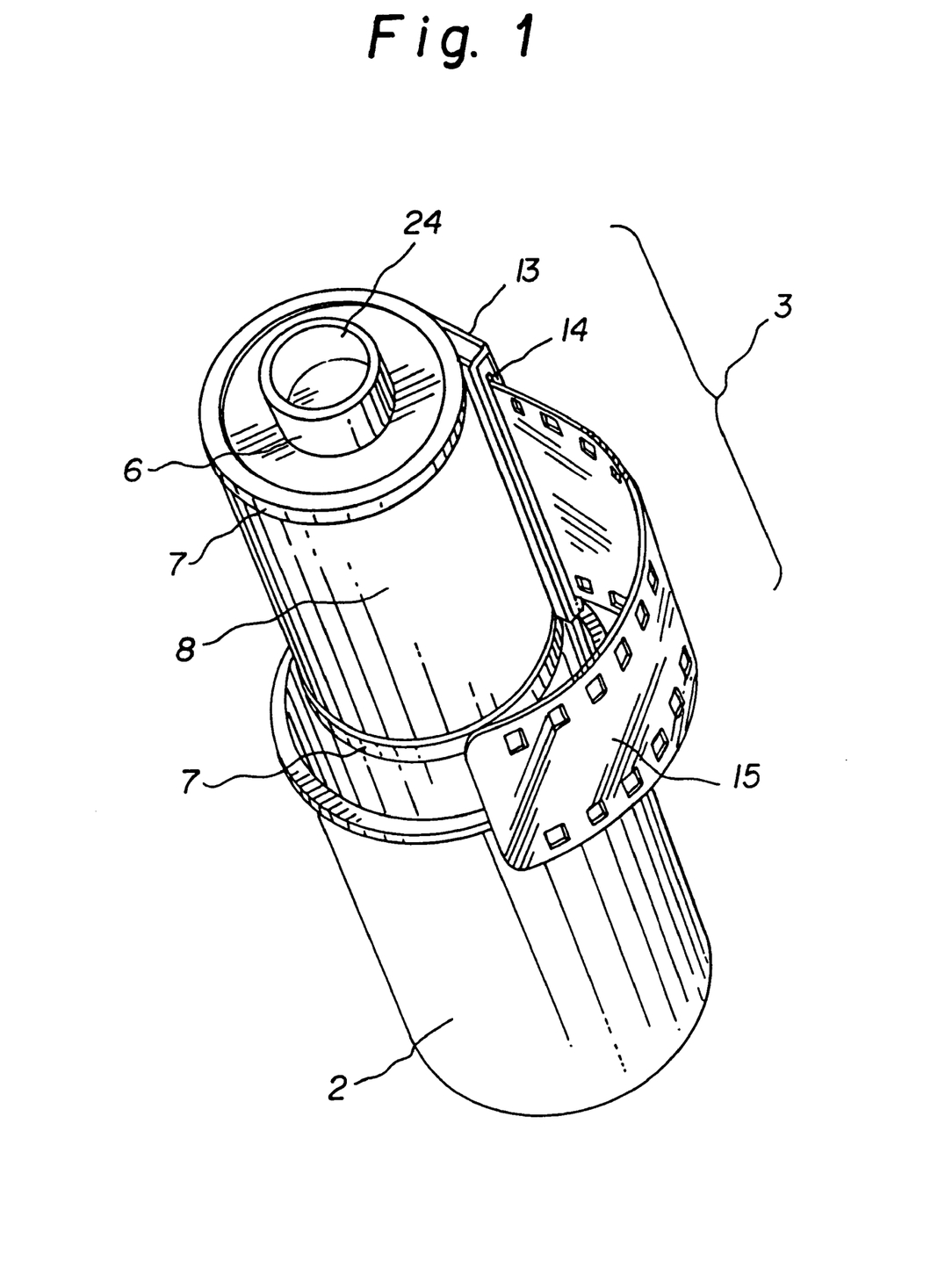
FIG. 1 is an exploded view of the product, typically a 35 mm film cartridge and a canister.
Figure 2A:
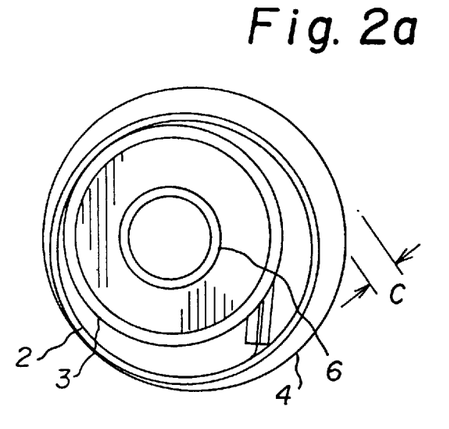
FIGS. 2a to f shows various random positions of the canister, and cartridge relative to the nest.
Figure 2B:
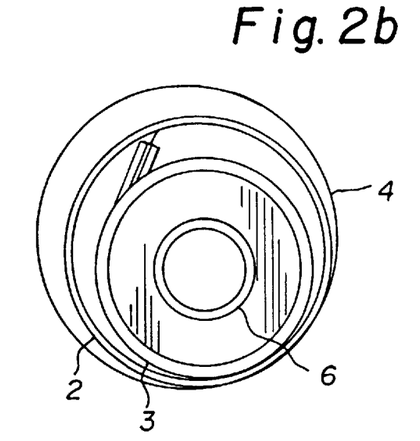
Figure 2C:
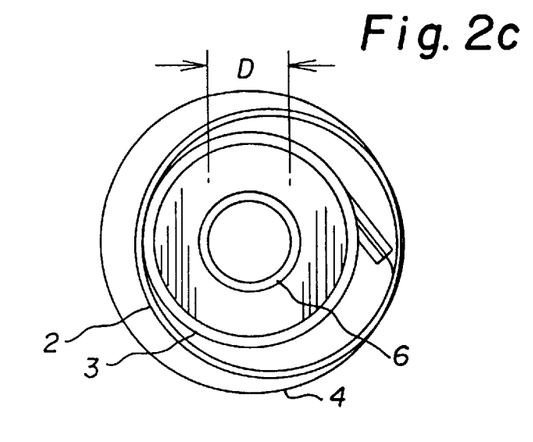
Figure 2D:
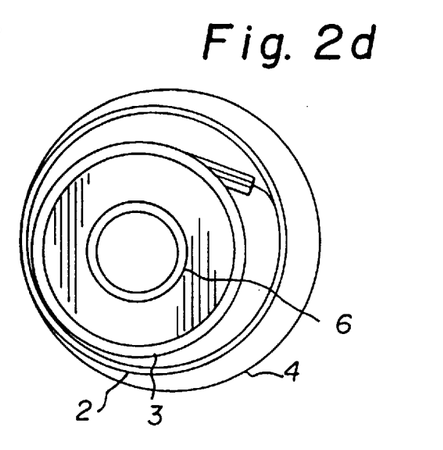
Figure 2E:
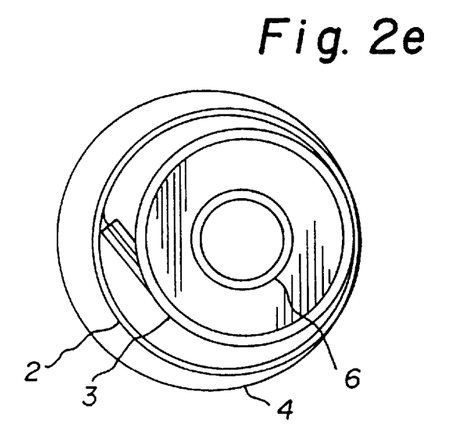
Figure 2F:
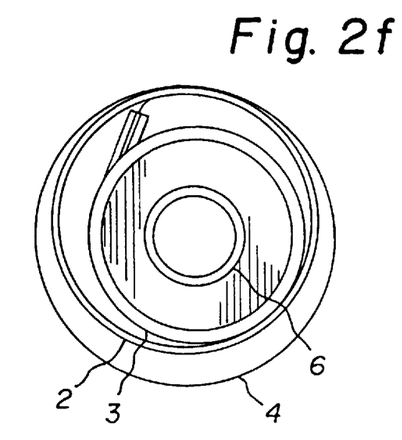
Figures 3A, 3B:
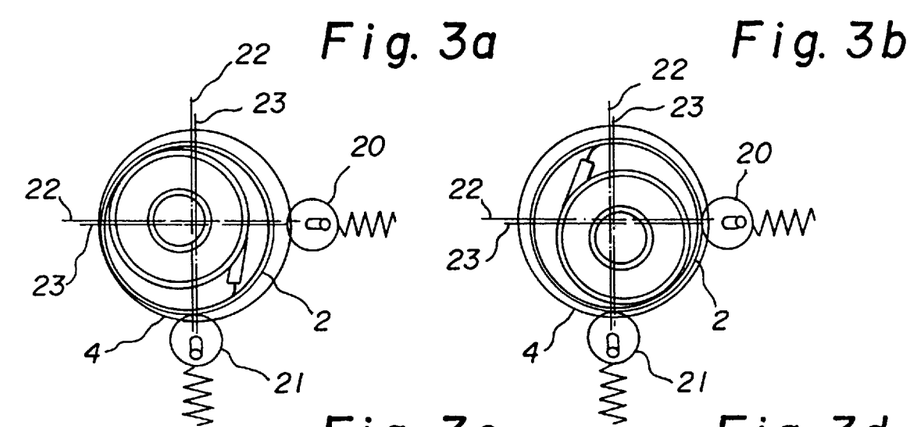
FIGS. 3a to f shows various random positions of the canister, and cartridge relative to the nest, with the addition of a spring loaded nudging roller to help center the canister.
Figures 3C, 3D:
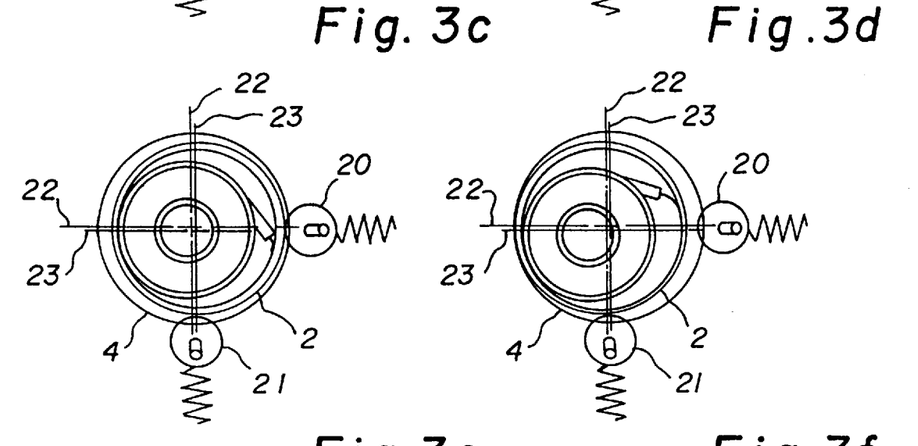
Figures 3E, 3F:
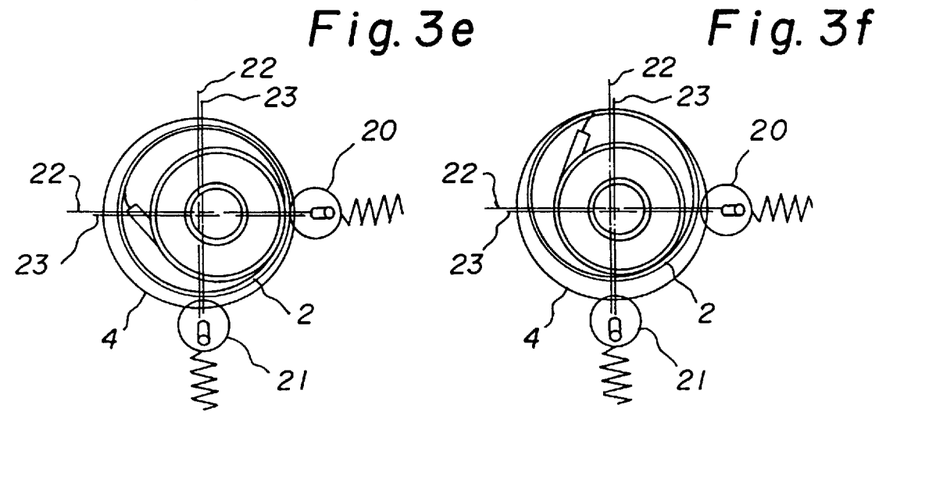
Figure 4A:
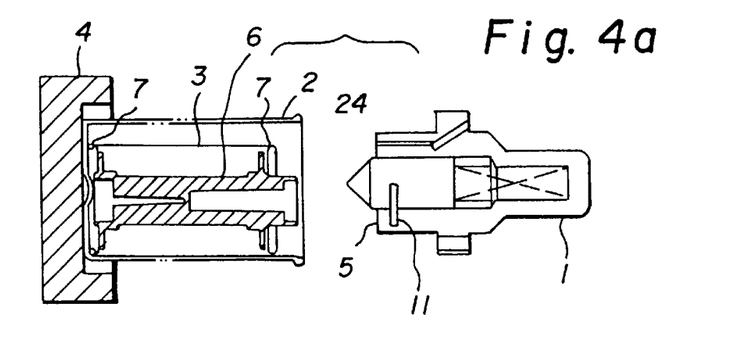
FIGS. 4a to d show a step by step sequence of operations for the conical centering process.
Figure 4B:
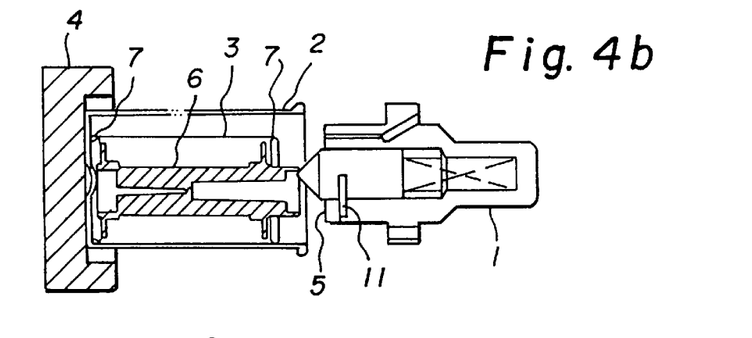
Figure 4C:
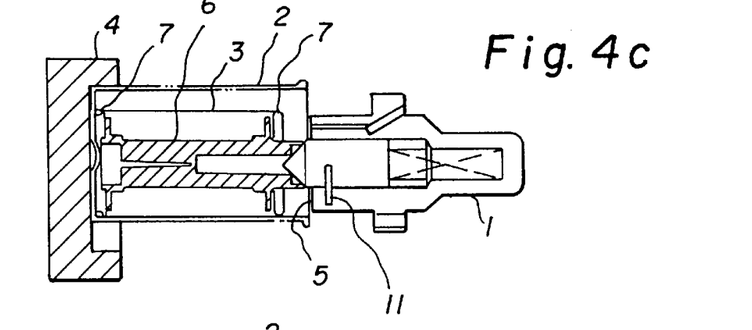
Figure 4D:
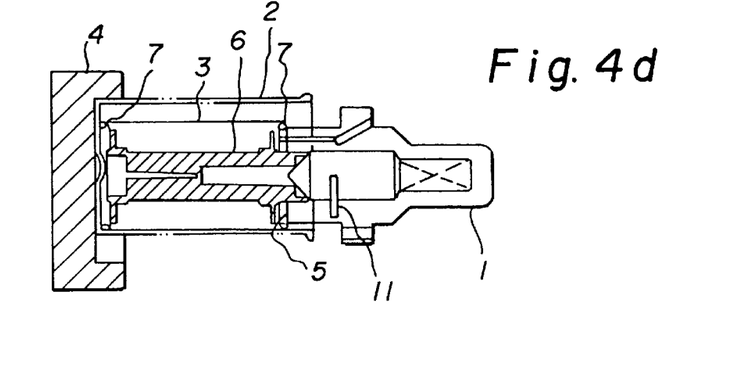

FIG. 1 is an enlarged view of the product assembly which consists of a plastic canister 2 and a cartridge 3, such as a 35 mm film cartridge. The cartridge 3 is made up of a spool 6, preferably made of plastic, a steel shell or magazine 8, and two steel end caps 7, which are staked onto the ends of the magazine. There is a flat section 13 on the magazine 8 where the film exits the cartridge 3. Protruding out of the cartridge 3 (preferably, approximately 58 mm) through the exit slot 14 in the flat section is the film leader 15. The film leader 15 tends to act as a leaf spring and pushes the cartridge 3 up against the inside wall of the canister 2 on the side opposite from where the film exits the cartridge 3. This phenomenon helps hold the cartridge 3 in one place relative to the inside of the canister 2. Note that the cartridge 3 is free to move anywhere within the confines of the canister 2.

FIGS. 2a to f shows the cartridge 3, inside of the canister 2 sitting randomly in the nest 4 and randomly in the canister 2. The centerline shown represents the centerline of the nest 4 and the tooling head. As seen in all six orientations, no matter where the canister 2 and cartridge 3 is located, the centerline of the tooling head 1, always falls within the inside cavity of the spool 6. The clearance between the canister 2 and the nest 4 is less than ½ the dimension of the inside diameter of the spool 4. (½ inside diameter of spool=inside radius of spool) Therefore the tooling head will always fall inside the envelope defined by the inside diameter of the spool. This is critical to the functionality of the design. As shown, dimension C<dimension D/2. Therefore when the tooling head 1 lowers itself and engages the spool 6, it will always draw the spool 6 and cartridge 3 back towards center.

FIGS. 3a through f represent various random positions of the canister and cartridge with an optional spring loaded member, such as a roller, to help nudge the product towards the center. The spring force would typically be applied at points 20 and 21 as shown. Centerline 22 represents the center of the tooling head, while centerline 23 represents the center of the nest 4. The spring loaded member is used to push the canister 2 over towards the center of the tooling head. By using a spring loaded member to move the canister 2, it effectively reduces the diameter of the nest where the canister 2 can be located, hence the amount that the cartridge can be off-set from the tooling head. However because it's spring loaded, the spring can collapse to give the canister more room when needed.

FIGS. 4a through d shows a step by step sequence of operations for the centering device. In all four steps a tooling head 1 is shown which provides a means to hold the exposed film indicator disk 5 in place during the assembly operations, and provides a means to properly locate the exposed film indicator disk 5 on center until it is assembled to the cartridge 3. FIGS. 5 through 8 show a close up view of each step in the sequence of assembly operations with a detailed description.

Figure 5:
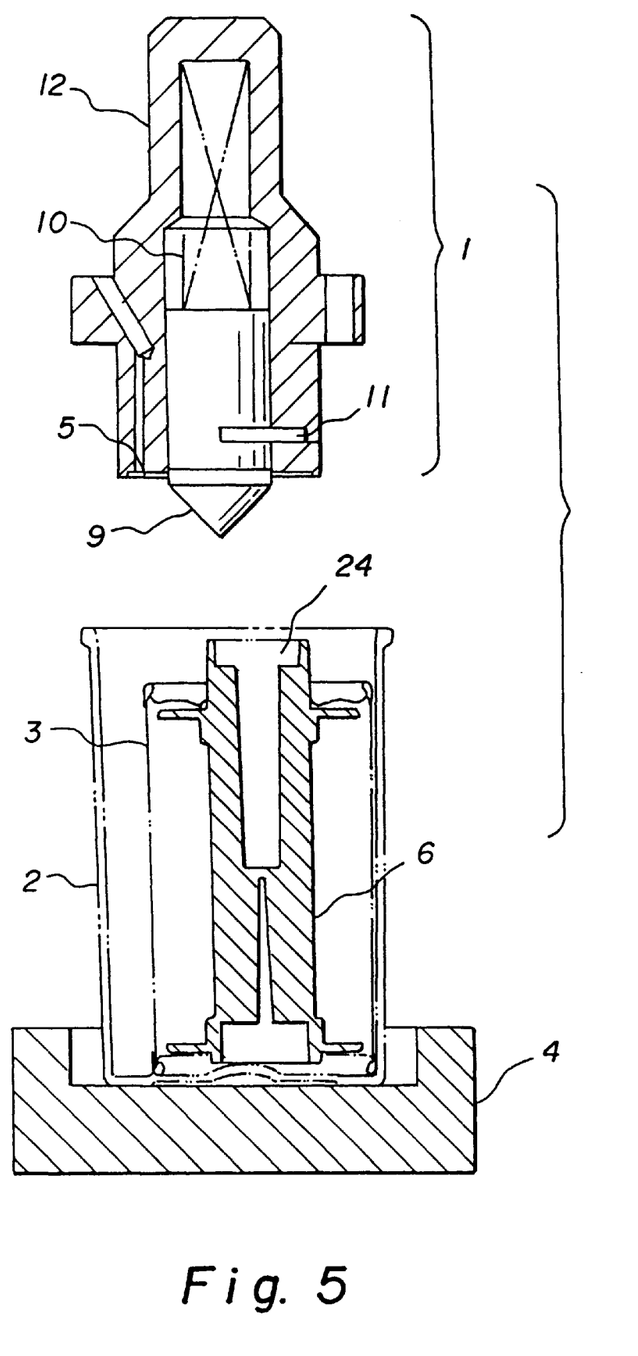
FIG. 5 shows the conical centering device in the start position.

FIG. 5 shows the tooling head 1 in the start position. The tooling head consists of a housing 12, a conical center 9, a spring 10 behind the conical center to give it compliance, and a keeper 11 to prevent the conical center 9 and thus the spring 10 from falling out of the housing 12. The housing 12 contains a passage way to allow vacuum to be ported to the bottom of the housing to hold the exposed film indicator disk 5 in place. The vacuum can be applied to an annular ring located above the housing. This is not shown for purposes of clarity. The conical center, constructed of steel, is similar to a dead center used on a lathe, as it's function is to draw and hold the cartridge "on center".

Below the tooling head is the product which consists of a canister 2 and a cartridge 3. The canister 2 is free to move relative to the tooling head 1 within the confines of the nest 4, and the cartridge 3 is free to move relative to the canister 2. As previously stated, the clearance in the nest is calculated to be less than the radius of the spool. Thus, it is guaranteed that the centerline of the tooling head 1 (i.e. conical center 9) will fall someplace within the cavity in the end of the spool 24. This will allow the conical center 9 to enter the spool 6 and constrain its movement. With the exposed film indicator disk 5 held in place by vacuum on the tooling head 1, the tooling head is lowered.

Figure 6:
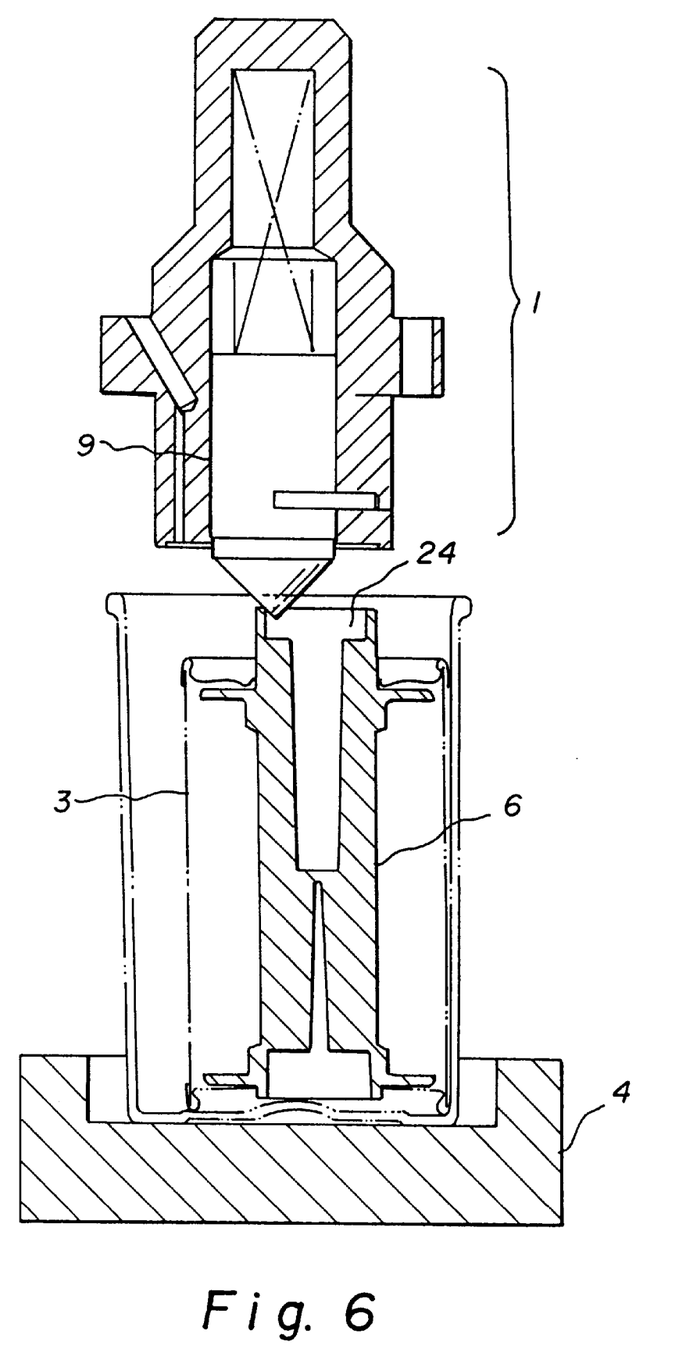
FIG. 6 shows the conical centering device as it begins to lower and enters the end of the spool.

FIG. 6 shows the tooling head 1 as it begins to lower and the conical center 9 enters the envelope of space defined by the cavity on the end of the spool 23. As soon as the tip of the conical center enters the spool 6, the cartridge 3 is now constrained and it cannot slide free. As the tooling head 1 continues lower, the inclined surface on the end of the conical center pushes against the inside diameter of the cavity on the end of the spool 24. This acts as a wedge, and pushes the spool cavity 24, and thus the spool 6 and cartridge 3 towards the centerline of the tooling head 1.

Figure 7:
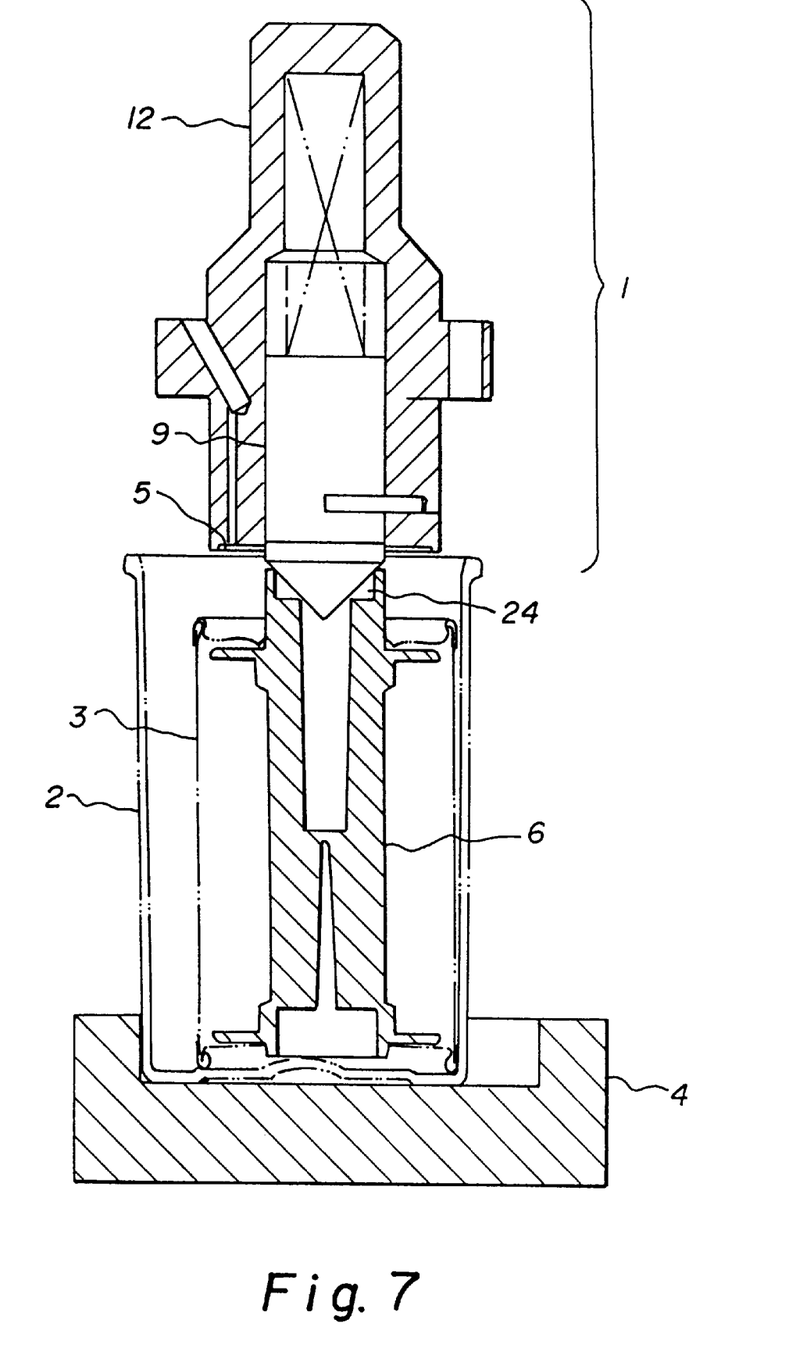
FIG. 7 shows the 35 mm film cartridge on center relative to the conical centering device.

In FIG. 7, the cartridge 3 is shown to be on center relative to the tooling head 1. Note, however, that the canister 2 is not necessarily on center relative to the nest 4. At this point, the conical center 9 is fully engaged into the spool cavity 24. This now guarantees that the cartridge is on center with the tooling head 1, and the exposed film indicator disk 5 can be applied to the end of the cartridge properly and concentrically. As the product transverses sideways from the position shown in FIG. 6 to the position shown in FIG. 7, the canister 2 has also moved with the cartridge 3 due to the fact that the film leader 15 acts as a member to couple the cartridge 3 to the canister 2. The film leader 15 is compliant however, so if there were excessive frictional force between the nest 4 and the canister 2, the canister may not move. Therefore the nest 4 must be smooth to help reduce friction and help facilitate this movement. If there is not sufficient clearance in the nest, the centering process as described here within may not function properly.

Figure 8:
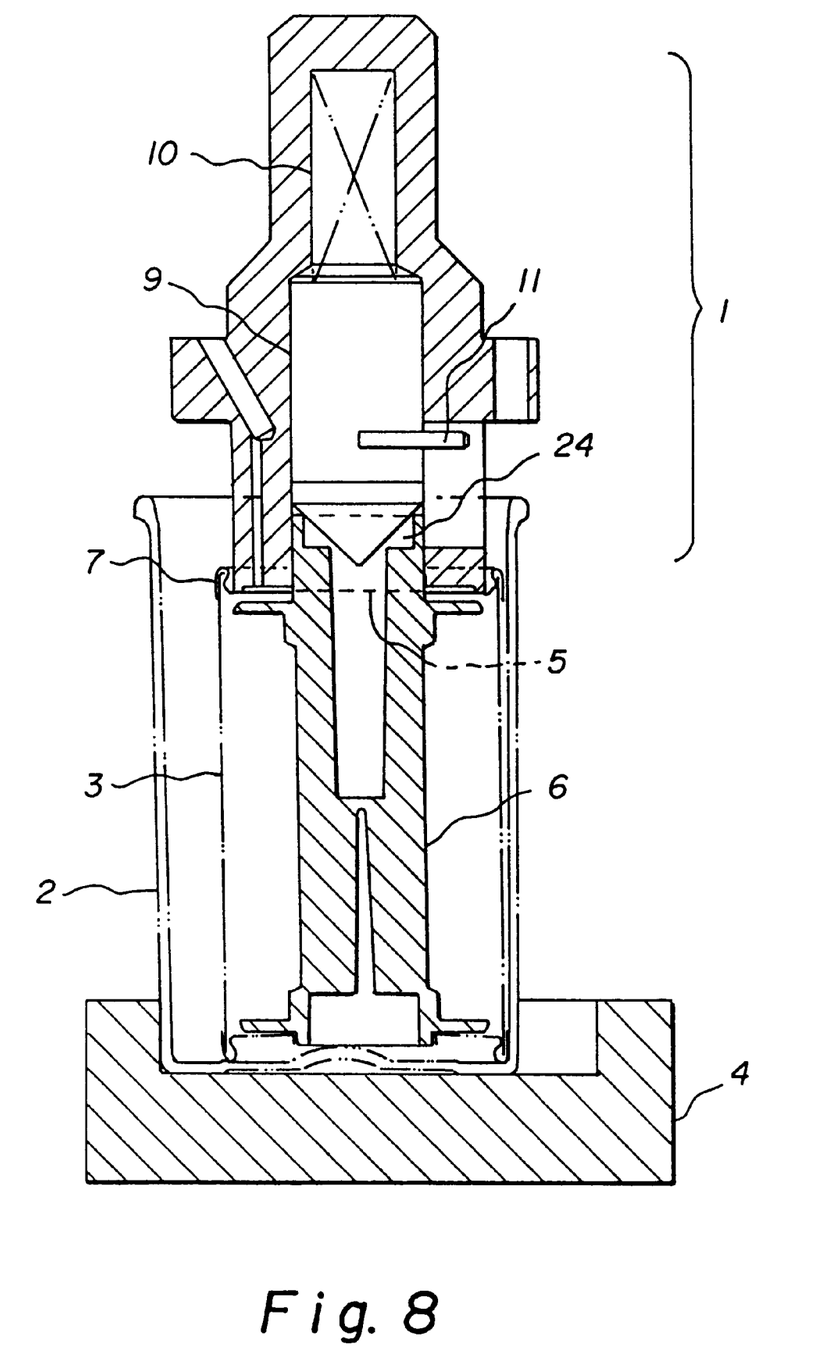
FIG. 8 shows the tooling head as it continues downward to apply the exposed film indicator disk to the spool.

FIG. 8 shows the tooling head 1 as it continues downward to apply the exposed film indicator disk 5. Once the conical center 9 has fully engaged the spool end 6 as described in the last step, there is no place for the spool to move to. Hence, as the tooling continues lower, the spring 10 in the center of the head begins to collapse due to the force exerted on the conical center 9 by the spool 6. The head now continues lower until the tooling head 1 bottoms out on the end cap 7, thus guaranteeing that the exposed film indicator disk will be applied to a fixed position, and always the same, relative to the end cap. By applying the exposed film indicator disk to a fixed location, the spool can not be forced against the magazine end cap, which can cause binding, and excessive torque requirements to turn the spool. There must also be clearance in the tooling head 1, for the conical center 9 to be able to retract into. This clearance must be greater than the distance the conical center collapses. Once the tooling head 1 has reached bottom and the exposed film indicator disk 5 has been applied, the vacuum will release and the tooling head 1 will return upward to the position shown in FIG. 5.

There is a subtle balance of spring force requirements needed to make this design function properly. The spring 10 must be strong enough that it does not compress as the tooling head conical center 9 moves the cartridge 3 and with it the canister 2 to its centerline. The frictional force developed between the canister 2 and the nest 4 during this relative motion, creates a normal force that presses through the spool 6 against the tooling head conical center 9. If this normal force exceeds the spring force, the spring 10 compresses, the conical center 9 retracts, and the cartridge 3 is not properly centered. Conversely, if the spring force is too great, damage will be caused to the end of the spool 6 as the exposed film indicator disk 5 is assembled to it.

The many features and advantages of the invention are apparent from the detailed specification and thus it is intended by the appended claims to cover all such features and advantages which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

PARTS LIST

1 Tooling Head
2 Canister
3 Cartridge
4 Nest
5 Exposed Film Indicator Disk
6 Spool
7 End caps (2)
8 Magazine
9 Conical Center
10 Spring
11 Keeper
12 Vacuum block
13 Flat Section of Magazine
14 Film Exit Slot (on Magazine)
15 Film Leader
20 Spring Loaded Nudging Roller
21 Second Spring Loaded Nudging Roller
22 Tooling Head Centerline
23 Nest Centerline
24 Spool Cavity

What is claimed is:

1. A process for assembling an exposed film indicator to a cartridge after the film has been placed in a cartridge containing a spool, said cartridge being in a canister in a nest, the process comprising:

a) using a tooling head containing a conical center and a spring behind said conical center in a housing which contains a passage way to allow vacuum to hold an exposed film indicator disk in place, to center the exposed film indicator disk to the canister so that the indicator can be assembled to the end of said cartridge;

b) supplying vacuum to hold the disk to the tooling head;

c) providing a clearance in said nest that is less than the radius of the spool;

d) lowering the tooling head to drive the spool cavity towards the center of the tooling head;

e) fully engaging the conical center into the spool cavity and applying the disk to the end of the cartridge; and f) releasing the vacuum.

2. The process of claim 1 wherein a keeper is used to prevent the spring from falling out of the tooling head.

3. The process of claim 1 wherein the film cartridge is a 35 mm film cartridge.

4. An apparatus for centering a disk to a film cartridge after the film has been placed in the cartridge comprising:

a) a product which contains a cartridge containing a spool, said cartridge in a canister to which the disk is to be applied and a nest;

b) a tooling head comprising a housing, a conical center, a spring which is behind the conical center wherein the housing contains a passage way to allow vacuum to be ported to the bottom of the housing; and c) a disk attached to the tooling head so that the disk can be lowered onto the cartridge.

5. The apparatus of claim 1 wherein a keeper is used to prevent the spring from falling out of the tooling head.

6. The apparatus of claim 1 wherein the film cartridge is a 35 mm film cartridge.

7. The apparatus of claim 1 wherein the tooling head has a shoulder built into it that acts as a stop to control the position that the exposed film indicator disk is applied to, relative to the cartridge, thus controlling spool float.

8. The apparatus of claim 1 additionally comprising a roller which nudges the product towards the center.

9. The apparatus of claim 8 wherein the roller is spring loaded.

* * * * *